(12) United States Patent
Mamo et al.

(10) Patent No.: US 12,298,874 B2
(45) Date of Patent: *May 13, 2025

(54) SYSTEM AND METHOD FOR UPDATING A NON-PERSISTENT COLLECTOR DEPLOYED IN A COMPUTE ENVIRONMENT

(71) Applicant: CrowdStrike, Inc., Sunnyvale, CA (US)

(72) Inventors: Eyal Mamo, Tel Aviv (IL); Amir Sidis, Tel Aviv (IL); Omri Ivanir, Tel Aviv (IL)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/456,738

(22) Filed: Aug. 28, 2023

(65) Prior Publication Data

US 2023/0409454 A1 Dec. 21, 2023

Related U.S. Application Data

(63) Continuation of application No. 17/644,476, filed on Dec. 15, 2021, now Pat. No. 11,860,752.

(51) Int. Cl.
*H04L 9/40* (2022.01)
*G06F 11/30* (2006.01)
*H04L 67/141* (2022.01)

(52) U.S. Cl.
CPC ........ *G06F 11/3006* (2013.01); *H04L 63/123* (2013.01); *H04L 67/141* (2013.01)

(58) Field of Classification Search
CPC .. G06F 11/3006; H04L 63/123; H04L 67/141; H04L 67/10; H04L 67/34
See application file for complete search history.

(56) References Cited

U.S. PATENT DOCUMENTS

| | | | |
|---|---|---|---|
| 2010/0228849 A1* | 9/2010 | Moore | G06F 9/54 709/224 |
| 2013/0124669 A1* | 5/2013 | Anderson | G06F 11/301 709/224 |
| 2014/0164598 A1* | 6/2014 | Srinivasan | H04L 41/0213 709/224 |
| 2017/0353543 A1* | 12/2017 | Baltar | H04L 41/0816 |
| 2018/0063290 A1* | 3/2018 | Yang | H04L 41/0853 |
| 2019/0058643 A1 | 2/2019 | Knowles et al. | |
| 2019/0095245 A1* | 3/2019 | Abes | G06F 9/505 |

(Continued)

FOREIGN PATENT DOCUMENTS

CN 111782345 A 10/2020

*Primary Examiner* — Cheikh T Ndiaye
(74) *Attorney, Agent, or Firm* — Womble Bond Dickinson (US) LLP

(57) ABSTRACT

A system and method for updating a non-persistent collector deployed in a compute environment includes scheduling a collector to collect data from a workload, performing a check to determine if a version of an executable collector application present thereon is a current version, upon determining the application version is not the current version, updating the collector version to the current version, executing the current version to collect data from the workload, and removing the collector from the workload upon completion of the operation by the collector.

21 Claims, 5 Drawing Sheets

(56) References Cited

U.S. PATENT DOCUMENTS

2019/0149535 A1* 5/2019 Greetham ............... H04L 67/75
 726/7
2021/0328877 A1* 10/2021 Jung .................... H04L 41/065
2021/0373924 A1* 12/2021 Sivaraman ............. G06F 9/505

* cited by examiner

SYSTEM AND METHOD FOR UPDATING A NON-PERSISTENT COLLECTOR DEPLOYED IN A COMPUTE ENVIRONMENT

CROSS-REFERENCE TO RELATED APPLICATIONS

This application is a continuation of U.S. patent application Ser. No. 17/644,476 filed Dec. 15, 2021, the contents of which are hereby incorporated by reference.

TECHNICAL FIELD

The present disclosure relates generally to discovering and inspecting applications and services in compute environments and specifically to agentless discovery and inspection of applications and services in compute environments.

BACKGROUND

A significant portion of data processing and handling, which effects practically every aspect of our days is handled in cloud based computing environments, such as Amazon® Web Services, Microsoft® Azure and Google® Cloud Platform, just to name a few. What can now be done in cloud based computing environments was not too long ago done on networks which were local, and with their locality came a certain degree of security, insofar as server hardware can be more readily accounted for. Indeed, some organizations today still operate on local networks, having local servers and other compute resources, whether for legacy or security reasons. Other organizations have moved fully into cloud native infrastructure, while a portion of organizations is hybrid, having solutions in both worlds.

Naturally with these various deployments challenges arise, such as getting visibility on the resources in one's organization, as well as architecture drift, which describes the changes made in compute environments that were not part of the deployment plan. For example, a cloud environment may be deployed through declaration code of an infrastructure as code (IaC) platform, such as Terraform®, and once the instances are deployed in the cloud environment, undergo changes for a variety of reasons, such as changing security policies, adding workload types, upgrading versions, etc.

Thus, it becomes difficult for an administrator of such systems, which can be spread across multiple different types of compute environments, to get a clear picture of what is currently active, and how elements in the environment interact with each other.

Prior art solutions which monitor system configuration, require an agent be installed in the systems which should be managed by them. Installing an agent in a production environment leads to complications in deployment, as complex authorizations are typically required and updating versions requires work to be put in by R&D teams to ensure that the agent version does not interfere with normal operation of the production environment. This is not always a practical solution.

It would therefore be advantageous to provide a solution that would overcome at least the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for updating a non-persistent collector deployed in a compute environment. The method comprises: scheduling a collector to collect data from a workload, performing a check to determine if a version of an executable collector application present thereon is a current version, upon determining the application version is not the current version, updating the collector version to the current version, executing the current version to collect data from the workload, and removing the collector from the workload upon completion of the operation by the collector.

Certain embodiments disclosed herein also include a non-transitory computer readable medium having stored thereon instructions causing a processing circuitry to execute a process, the process comprising: scheduling a collector to collect data from a workload, performing a check to determine if a version of an executable collector application present thereon is a current version, upon determining the application version is not the current version, updating the collector version to the current version, executing the current version to collect data from the workload, and removing the collector from the workload upon completion of the operation by the collector.

Certain embodiments disclosed herein also include a system for updating a non-persistent collector deployed in a compute environment. The system comprises: a processing circuitry, and a memory, the memory containing instructions that, when executed by the processing circuitry, configure the system to: schedule a collector to collect data from a workload, perform a check to determine if a version of an executable collector application present thereon is a current version; upon determination that the application version is not the current version, update the collector version to the current version, execute the current version to collect data from the workload, and remove the collector from the workload upon completion of the operation by the collector.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
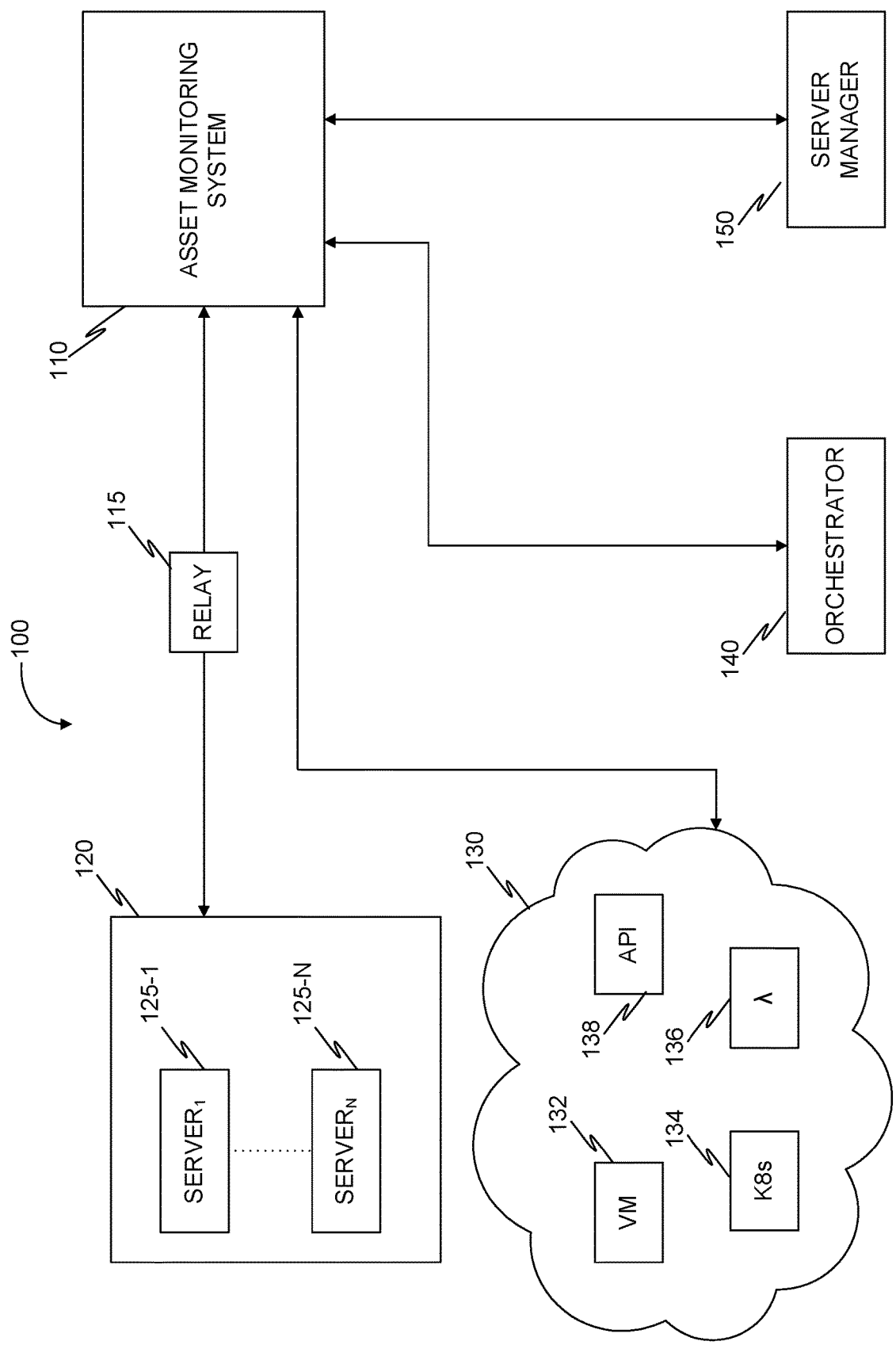
FIG. 1 is a schematic illustration of an asset monitoring system monitoring various compute environments, implemented according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

A system and method for agentless discovery and inspection of applications and services in a compute environment includes establishing a connection with a first workload in a first compute environment. The first compute environment includes a plurality of workloads. The system causes installation of a collector on the first workload, wherein the collector, when executed, is configured to collect data from the first workload. Collected data is received from the collector, and the collector is configured to remove the executable code of the collector upon completing data collection. Access is provided to the collected data for an asset monitoring system, wherein the asset monitoring system is configured to discover from the collected data at least an application executed on the first workload.

FIG. 1 is an example of a schematic illustration of an asset monitoring system 100 monitoring various compute environments, implemented according to an embodiment. The asset monitoring system 110 (hereinafter 'system 110') is described in more detail in U.S. Non-Provisional application Ser. No. 17/513,117 filed on Oct. 28, 2021, the contents of which are hereby incorporated by reference.

The system 110 is communicatively coupled with a plurality of compute environments, such as first compute environment 120 and to a cloud computing environment 130. While a plurality of compute environments are described in this embodiment, it should be readily apparent that the system 110 may be implemented to communicate with a single compute environment, multiple systems 110 may each be configured to communicate with a single type of compute environment, a system may be implemented in a compute environment, or any combination thereof. A compute environment, such as compute environment 120 may be a cloud computing environment, or other networked environment in which a plurality of workloads, computer devices, such as servers, and the like, may communicate with each other. In certain embodiments, the system 110 may connect to a compute environment via a relay 115, which is used to direct network traffic.

The system 110 may be implemented as a virtual appliance, for example an Open Virtualization Appliance (OVA) in VMware®. Such a virtual appliance may be deployed in a cloud environment, such as the cloud environments described below. In an embodiment the system 110 may be executed on a container running in a Kubernetes® cluster.

For example, the system 110 is connected to a first compute environment 120 through a relay 115. The first compute environment 120 is a closed network, and includes a plurality of computer servers 125, or individually server 125-1 through 125-N, where 'N' is an integer having a value of '2' or more. Each server 125 is a computer, and includes at least a processing circuitry, memory, and network interface. Some compute environments similar to the first compute environment 120 may require an asset monitoring system 110 to be installed physically in the compute environment 120. In an embodiment, the system 110 may communicate with a server 125 utilizing a secure network protocol, such as SSH (secure shell), using account login information provided to the system 110. The login information may include a username and password, wherein the account is authorized to install executable code files on the server 125.

The system 110 is further communicatively connected to a cloud computing environment 130. The cloud computing environment 130 may be, or may be implemented using, for example, Amazon® Web Services (AWS), Microsoft® Azure, Google® Cloud Platform (GCP), and the like. For example, the cloud computing environment 130 may be a virtual private cloud (VPC) environment, implemented on top of infrastructure provided by AWS or Azure.

The asset monitoring system 110 is operative for collecting data from compute environments, analyzing the collected data, and discovering applications and communications between such applications. An example implementation of such a system is further discuss in U.S. patent application Ser. No. 17/513,117, the entire contents of which are incorporated herein by reference.

The cloud computing environment 130 may include various workloads. A workload may be a virtual machine 132, a container cluster 134, a serverless function 136, and the like. Virtual machines may be implemented, for example utilizing VMware®. Container clusters can be implemented utilizing Kubernetes®. A serverless function can be implemented, for example using Amazon® Lambda. The cloud computing environment 130 further includes an application programming interface (API) through which various functions of the cloud computing environment 130 may be accessed or requested.

The system 110 may further be communicatively connected to an orchestrator 140, and a server manager 150. The orchestrator 140 is a component of a cloud computing environment. An orchestrator may be, for example, Amazon® Elastic Container Service (ECS), or Azure App Service. A server manager (or server management system) may be, for example, Chef® EAS, Puppet®, Ansible®, Azure® Automation, and the like.

The asset monitoring system 110 is configured to communicate with each compute environment and extract data from the workloads thereon, for example using collector applications. For example, the system 110 may initiate an SSH connection to a server 125, and cause the server 125 to install a collector application (not shown).

The collector application (or simply "collector") is programmed to open a communication channel to the system 110 and provide over the communication channel data collected from the server 125 on which it is installed. When the collector has finished sending the required data, the collector is configured to remove itself from the server 125. Different methods of operating collectors are discussed below.

Figure 2:
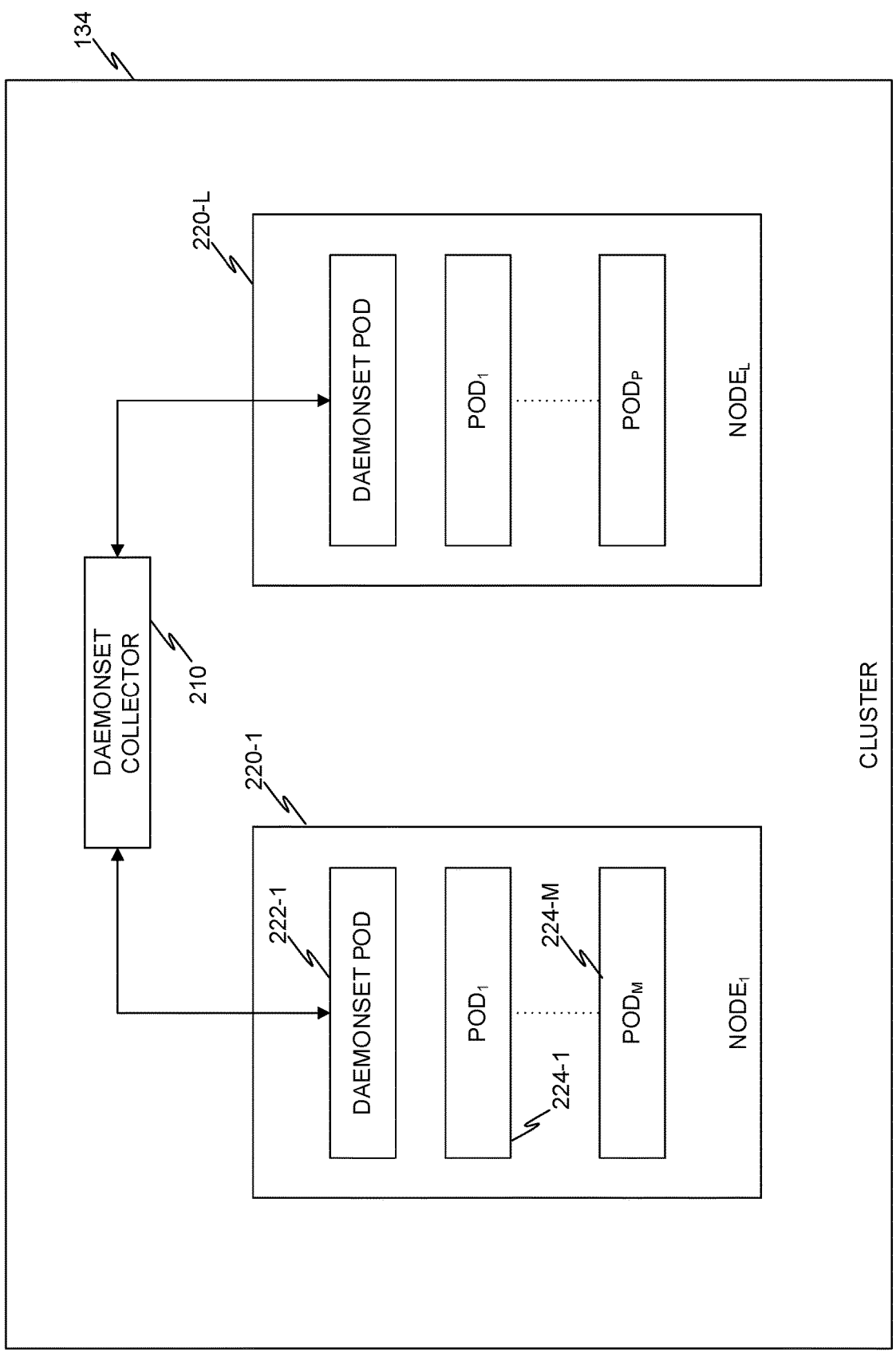
FIG. 2 is a container cluster utilizing a collector, implemented in accordance with an embodiment.

FIG. 2 is an example diagram of a container cluster 134 utilizing a collector, implemented in accordance with an embodiment. A container cluster 134 may include a plurality of nodes 220, individually referenced as nodes 220-1 through 220-L, where 'L' is an integer having a value of '2' or greater. Each node 220 includes a daemonset pod, such as daemonset pod 222-1, and a plurality of pods 224, such as pod 224-1 through 224-M, where 'M is an integer having a value of '2' or greater. A daemonset collector 210 is configured, for example by the system 110 of FIG. 1, to install a collector on each node in the cluster. In an embodiment, collector installation may occur periodically. The daemonset collector 210 may further configure the collector for each node to delete itself once collection of data is complete.

In an embodiment, the daemonset collector 210 may install a collector on a node, wherein the collector is configured to collect application data. Application data may be collected from multiple sources, utilized to execute, develop, or otherwise deploy in the compute environment. The collected data may include, but is not limited to, the binary code of each application, software libraries, error logs, script code, configuration files (environment variables, command line, etc.), credentials, and the like. Binary code, or any code, may be collected by collectors executed on the servers hosting an application. The data is collected per each application and may include binary code and configurations. The collection of such data can be triggered at predefined time intervals, or upon receiving an event from a software deployment tool (e.g., a CI/CD tool). For example, using Harness® or Jenkins™ to deploy an application in a cloud environment may trigger a webhook in an asset monitoring system to begin collection.

In certain embodiments the daemonset collector 210 is configured to communicate with the system 110, for example in order to receive version updates. This is discussed in more detail in FIG. 4 below.

Figure 3:
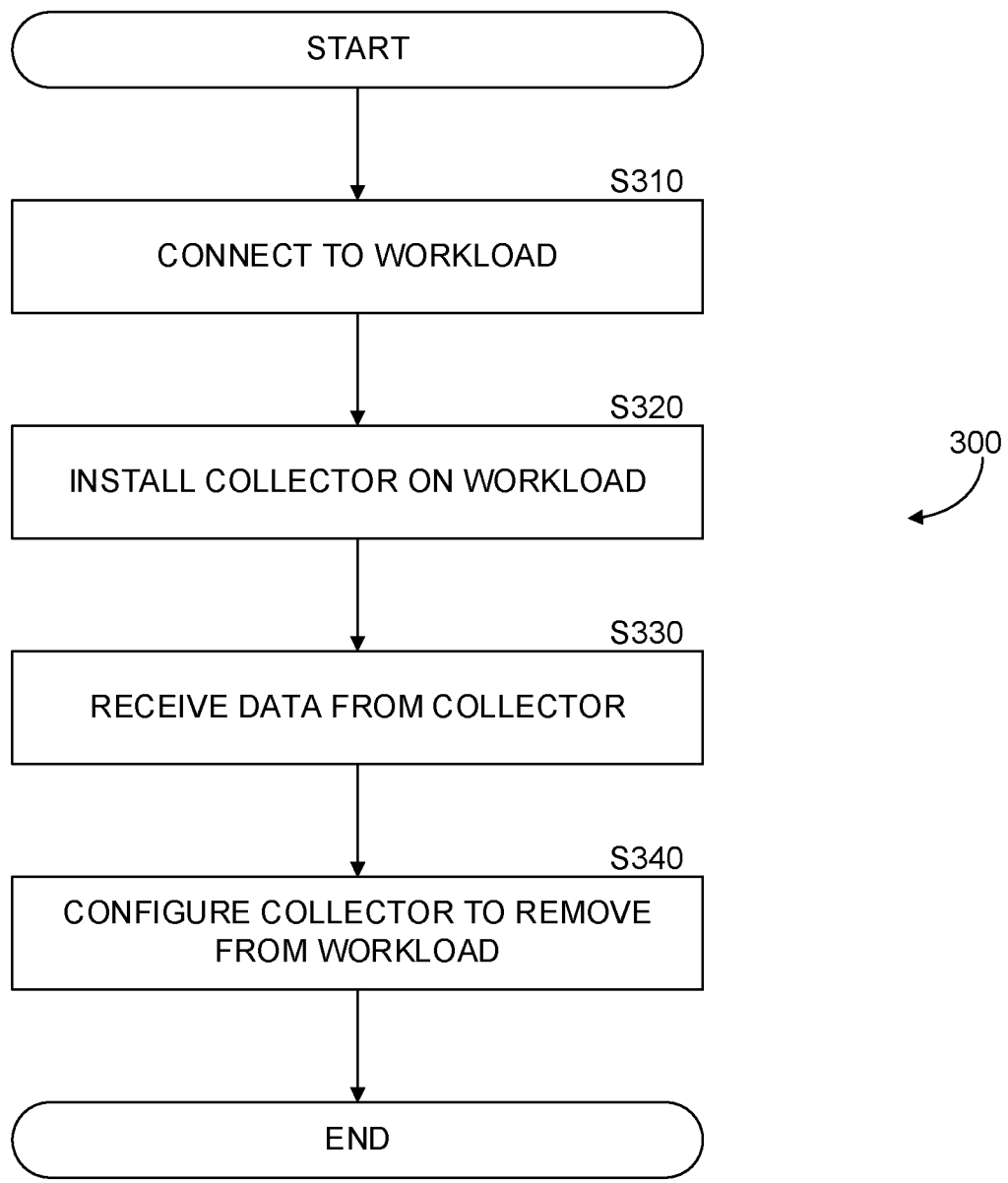
FIG. 3 is a flowchart of a method for collecting data artifacts from compute environments, implemented in accordance with an embodiment.

FIG. 3 is an example of a flowchart 300 of a method for collecting data artifacts from compute environments, implemented in accordance with an embodiment.

At S310, a connection is established between an asset monitoring system and a workload. Establishing a connection may include, for example, opening an SSH communication between a workload and the asset monitoring system. A workload may be a physical computer device, such as server 125-1 of FIG. 1 above, or a virtual workload. A virtual workload may be a virtual machine, container, serverless function, and the like. In some embodiments, a connection may be established from the workload to the asset monitoring system. For example, a daemonset collector may install a collector on a node, whereby the collector then establishes a communication path to the asset monitoring system based on predetermined instructions provided by the daemonset collector.

At S320, a collector is installed on the workload, wherein installation is under the control of the asset monitoring system. In an embodiment, the collector is provided as executable code and the workload is configured to execute the code as it is received, or at a future time. Installing the collector may further include downloading the executable code, for example from the asset monitoring system.

At S330 data is received from the collector. In an embodiment the collector is configured to collect application data. Application data may be collected from multiple sources, utilized to execute, develop, or otherwise deploy in the compute environment. The collected data may include, but is not limited to, the binary code of each application, software libraries, error logs, script code, configuration files (environment variables, command line, etc.), credentials, and the like. Binary code, or any code, may be collected by collectors executed on the servers hosting an application. The data is collected per each application and may include binary code and configurations. The collection of such data can be triggered at predefined time intervals, or upon receiving an event from a software deployment tool (e.g., a CI/CD tool).

At S340, the collector is removed from the workload, wherein removal (or uninstallation) is performed under control of the asset monitoring system. In an embodiment, the collector may be predefined with instructions to remove the executable code once collection has concluded. In an embodiment, collection may be determined to be concluded once certain predetermined searches are performed, once all the collected data has been sent to the asset monitoring system, or a combination thereof. In all use cases, the collector is not persistent. Having a non-persistent application is beneficial, as deployment does not require complex integration. For example, in agent-based systems, it is typically required that the agent be installed in all instances in the compute environment, which requires R&D integration, and each update to the agent again requires integration. Contrasted, a non-persistent collector which is deployed on an as-needed basis requires little to no integration and may be updated frequently without involving R&D or making changes to the CI/CD stage. Additionally, having a non-persistent application provides increased security, as the most up to date version will always be provided from the asset monitoring system.

Certain embodiments may include collecting data from serverless functions, such as Amazon® Lambda. A collector for a serverless function may reside as an application in the asset monitoring system (e.g., system 110, FIG. 1), and collect data artifacts from the serverless function by requesting data from an API of the serverless function, for example the AWS API which can receive custom HTTP requests through which data can be received. Certain other embodiments may include platform as a service (PaaS) instance, which may be accessed similarly utilizing an API of the cloud computing environment.

Figure 4:
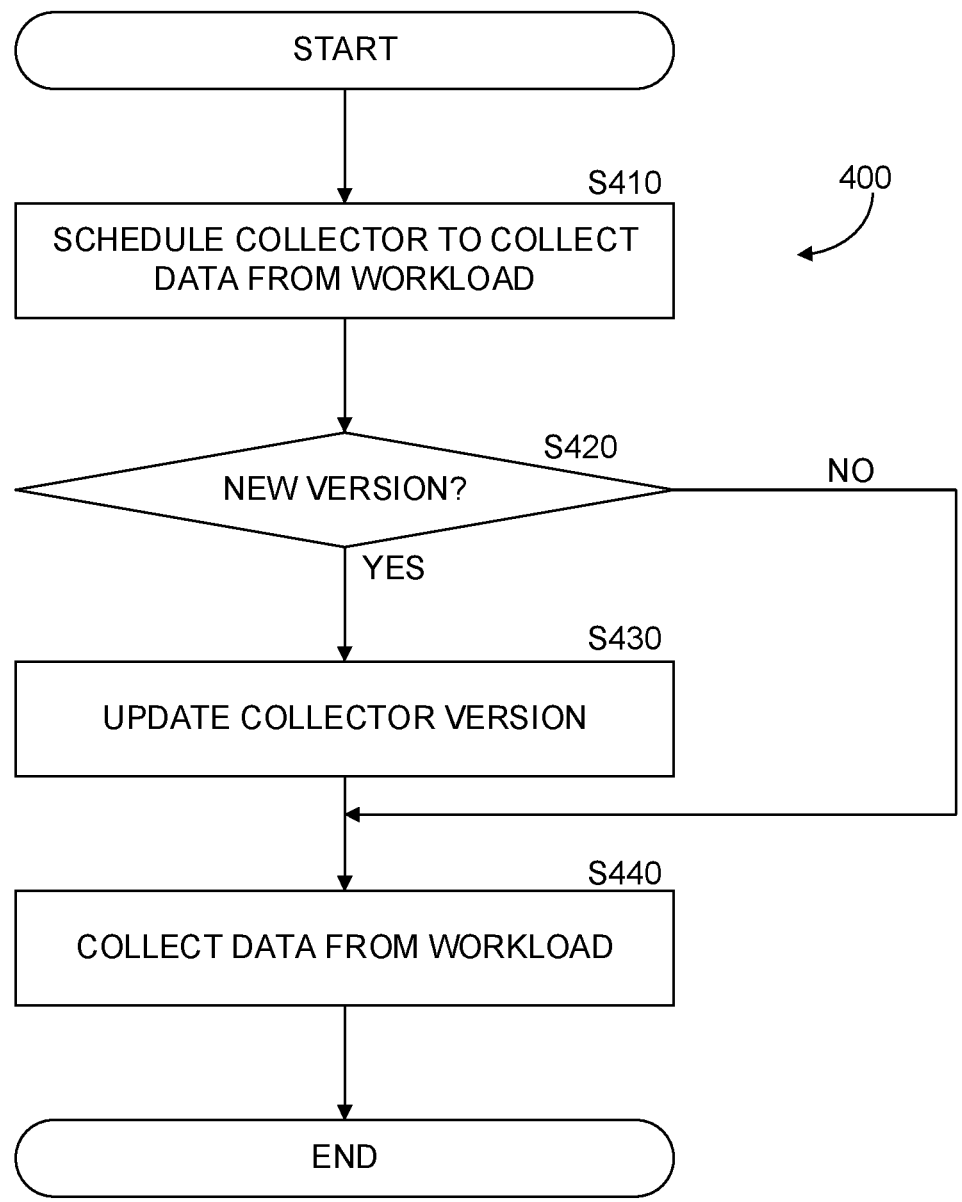
FIG. 4 is a flowchart of a method for updating a collector deployed in a compute environment, implemented in accordance with an embodiment.

FIG. 4 is an example flowchart 400 of a method for updating a collector deployed in a compute environment, implemented in accordance with an embodiment. In this example the compute environment is a cloud computing environment implementing container clusters. The method may be performed by an asset monitoring system, which installs a daemonset collector in the container cluster in order to manage and install collectors in each node of the cluster.

At S410 a collector is scheduled to collect data from a workload. For example, a daemonset collector as described above may be configured to generate a schedule, which includes at least one future time point, at which a collector will be installed on a node in the cluster in which the daemonset collector is operative. The daemonset collector is always present in the cluster, and installs collector applications on the nodes on a predefined basis. In an embodiment, the collector may be installed by the daemonset collector in response to receiving a collection request, for example from an asset monitoring system. As the collector is removed from the node upon completing collection, the collector is a non-persistent application.

At S420, a check is performed to determine if a version of the executable collector application present thereon is a current version. S420 may be performed by the daemonset collector. In an embodiment, the check may be performed by querying the asset monitoring system to determine what a current version of the collector executable code is. If the versions do not match, a request to download the current version of the collector executable code is sent to the asset monitoring system. A version is generally a unique identifier of the application, and typically version numbers ascend, so that if the application version of the daemonset collector is lower than the current version, the daemonset collector is configured to request a download of the current version. If a newer version is available execution continues at S430, if a newer version is not available execution continues at S440.

At S430, the collector version is updated. Updating the collector version may include sending a request to a server, such as the asset monitoring system, to receive a current version of the collector executable code. A connection, such as SSH (secure shell) or HTTPS (hypertext transfer protocol secure) may be established in order to transfer the file from the server to the cluster over a network. In an embodiment, the daemonset collector may retain one or more older versions of the collector application, which is useful if a rollback is required. A rollback is when a current software version is found to be lacking or defective in some way, and therefore an older version, which is proven to be stable, is regressed to while the current version undergoes correction. In certain embodiments the daemonset collector stores only the current version of the collector application.

At S440, data is collected from the workload. The data is collected by the collector, which is installed on the workload, in this example a Kubernetes® node, by a daemonset collector. Collected data is sent to the asset monitoring system for further processing. Once the data has been collected, the daemonset collector configures the node to remove the collector application. If a communication channel is open to the asset monitoring system the communication channel is closed. Collected data may include binary code of an application on the workload, a software library, an error log, a script code, a configuration file, credentials, and the like.

Figure 5:
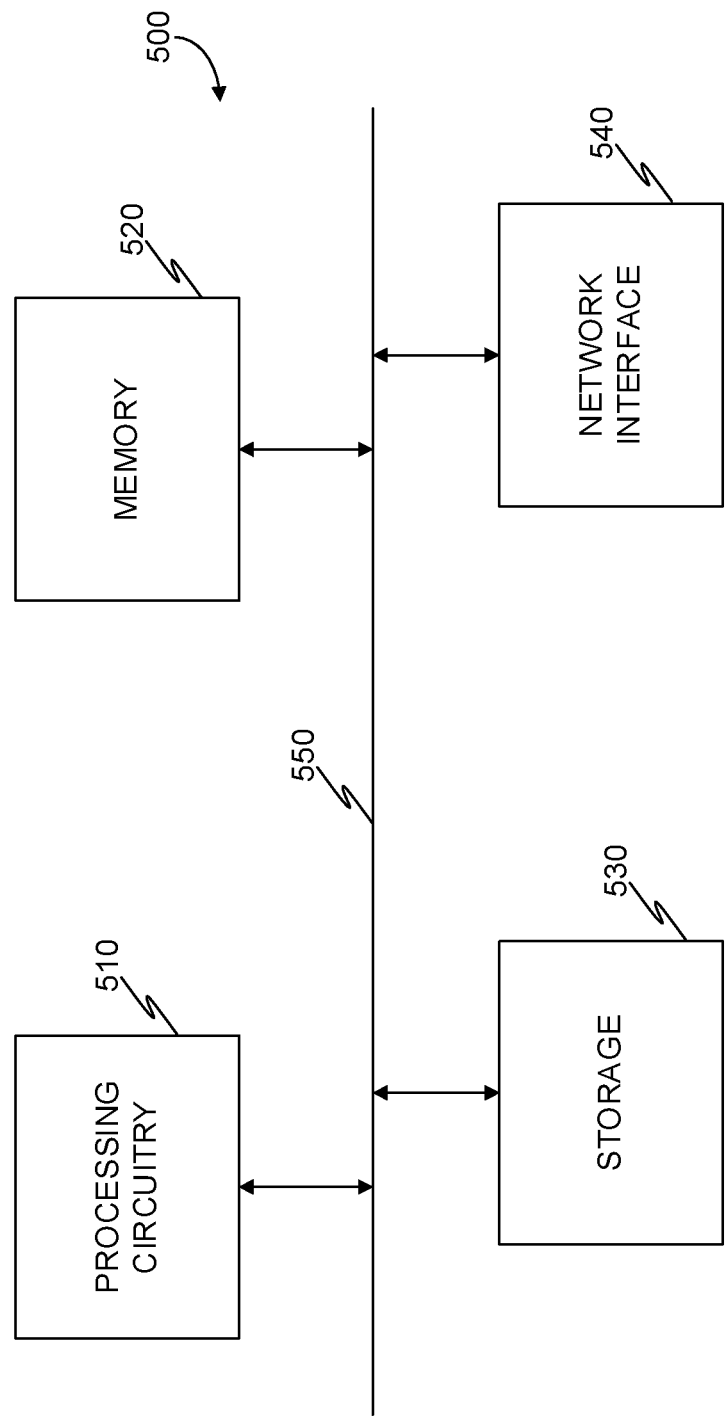
FIG. 5 is a schematic diagram of an asset monitoring system according to an embodiment.

FIG. 5 is an example schematic diagram of an asset monitoring system 500 according to an embodiment. The system 500 includes a processing circuitry 510 coupled to a memory 520, a storage 530, and a network interface 540. In an embodiment, the components of the system 500 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, or any other medium which can be used to store the desired information.

The network interface 540 allows the system 500 to communicate with, for example, various workloads, and collectors installed on the various workloads across different compute environments.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for updating a non-persistent collector deployed in a compute environment, comprising:
scheduling a collector to collect data from a workload;
performing a check to determine if a version of an executable collector application present thereon is a current version;
upon determining an application version is not a current version, updating a collector version to the current version;
executing the current version to perform an operation to collect data from the workload; and
removing the collector from the workload in response to completion of the operation by the collector.

2. The method of claim 1, wherein the compute environment is a cloud computing environment implementing container clusters.

3. The method of claim 1, further comprising:
installing a daemonset collector in a container cluster to manage and install collectors in each node of the cluster.

4. The method of claim 3, further comprising:
scheduling a collector to collect data from a workload.

5. The method of claim 4, further comprising:
configuring the daemonset collector to generate a schedule, the schedule including at least one future time point at which the collector will be installed on a node in a cluster where the daemonset collector is operative.

6. The method of claim 5, wherein updating the collector version to the current version further comprises:
sending a request to a server; and
receiving a current version of a collector executable code.

7. The method of claim 6, further comprising:
establishing a connection to transfer a file from the server to a cluster over a network.

8. The method of claim 1, wherein performing the check to determine if an application version is a current version further comprises:
querying an asset monitoring system to determine what a current version of a collector executable code is; and
upon determining the application version does not match the current version, sending a request to download the current version of the collector executable code to an asset monitoring system.

9. The method of claim 1, further comprising:
retaining at least one older version of the collector application, configured to be rollbacked to the current version, when a new current version is defective.

10. The method of claim 1, wherein removing the collector from the workload upon completion of an operation by the collector further comprises:
configuring the collector to be a non-persistent application.

11. A non-transitory computer readable medium having stored thereon instructions that, when executed by processing circuitry, cause the processing circuitry to:
schedule a collector to collect data from a workload;
perform a check to determine if a version of an executable collector application present thereon is a current version;
upon determining an application version is not the current version, update a collector version to the current version;
execute the current version to perform an operation to collect data from the workload; and
remove the collector from the workload in response to completion of the operation by the collector.

12. A system for updating a non-persistent collector deployed in a compute environment, comprising:
a processing circuitry; and
a memory, the memory containing instructions that, when executed by the processing circuitry, configure the system to:
schedule a collector to collect data from a workload;
perform a check to determine if a version of an executable collector application present thereon is a current version;
upon determination that an application version is not a current version, update a collector version to the current version;
execute the current version to perform an operation to collect data from the workload; and
remove the collector from the workload in response to completion of the operation by the collector.

13. The system of claim 12, wherein the compute environment is a cloud computing environment implementing container clusters.

14. The system of claim 12, the system being further configured to:
install a daemonset collector in a container cluster to manage and install collectors in each node of the cluster.

15. The system of claim 14, the system being further configured to:
schedule a collector to collect data from a workload.

16. The system of claim 15, the system being further configured to:
configure the daemonset collector to generate a schedule, the schedule including at least one future time point at which the collector will be installed on a node in a cluster where the daemonset collector is operative.

17. The system of claim 16, the system further being configured to:
send a request to a server; and
receive a current version of a collector executable code.

18. The system of claim 17, the system further being configured to:
establish a connection to transfer a file from the server to a cluster over a network.

19. The system of claim 12, the check to determine if an application version is a current version, being further configured to:
query an asset monitoring system to determine what a current version of a collector executable code is; and
upon determining the application version does not match the current version, send a request to download the current version of the collector executable code to an asset monitoring system.

20. The system of claim 12, the system further being configured to:
retain at least one older version of the collector application, configured to be rollbacked to the current version, when a new current version is defective.

21. The system of claim 12, wherein the removal of the collector from the workload upon completion of an operation by the collector, further configures the system to:
configure the collector to be a non-persistent application.

* * * * *